United States Patent
Salemann

(10) Patent No.: US 8,527,519 B2
(45) Date of Patent: *Sep. 3, 2013

(54) QUERY SYSTEM FOR A HYBRID VOXEL AND FEATURE DATABASE

(75) Inventor: Leo Salemann, Sammamish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,415

(22) Filed: Apr. 6, 2012

(65) Prior Publication Data

US 2012/0191723 A1      Jul. 26, 2012

Related U.S. Application Data

(63) Continuation of application No. 12/707,204, filed on Feb. 17, 2010, now Pat. No. 8,176,053.

(51) Int. Cl.
*G06F 17/30* (2006.01)
(52) U.S. Cl.
USPC .......................... 707/741; 707/755; 707/769
(58) Field of Classification Search
USPC ......................................... 707/741; 345/424
See application file for complete search history.

(56) References Cited

U.S. PATENT DOCUMENTS

2007/0229501 A1* 10/2007 Kouznetsov et al. ......... 345/424
2009/0060259 A1*  3/2009 Goncalves .................... 382/100

OTHER PUBLICATIONS

Larry Roelofs et al., "Applying Semantic Data Modeling Techniques to Large Mass Storage System Design", 1990, IEEE pp. 65-75.*

Lalonde, J., et al., "Natural terrain classification using three-dimensional ladar data for ground robot mobility," [online] Journal of Field Robotics, vol. 23, No. 10, Nov. 2006, pp. 839-861, retrieved from the Internet: <http://www.ri.cmu.edu/publication_view.html?pub_id=5611>.
Pollard, T., et al., "Change Detection in a 3-D World," [online] 2007 IEEE Conference on Computer Vision and Pattern Recognition, Jun. 17-22, 2007, retrieved from the Internet: <www.lems.brown.edu/~tpollard/pollard_mundy_cvpr07.pdf>.
Mundy, J., et al., "Uncertain geometry: a new approach to modeling for recognition," [online] Proceedings of the SPIE, Automatic Target Recognition XIX, vol. 7335, pp. 73350Q-73350Q-12, May 4, 2009, retrieved from the Internet: <http://www.lems.brown.edu/~ozge/SPIE-Mundy-OzcanliFinal.pdf>.
Gebhardt, S., et al., "Polygons, point clouds, and voxels, a comparison of high-fidelity terrain representations," 2009 SIWZIE Awards, Simulation Interoperability Standards Organization, Nov. 20, 2009.

* cited by examiner

*Primary Examiner* — Neveen Abel Jalil
*Assistant Examiner* — Jagdish Pandya
(74) *Attorney, Agent, or Firm* — Terry M. Sanks, Esq.; Beusse Wolter Sanks Mora & Maire, P.A.

(57) ABSTRACT

A hybrid database can receive a hybrid query for an object having a real world analog. A feature of a set of feature records can be determined that corresponds to the object. Feature-level attribute values of the feature can be extracted from the feature records. A set of uniquely indexed voxels can be determined. Each voxel can be a volumetric unit of the volumetric storage space that represents the volume of real-world geography. Voxel-level semantic values can be extracted from the set of uniquely indexed voxels from voxel records. Extracted voxel-level semantic values and extracted feature-level attribute values can be combined to generate a hybrid result. The hybrid result can be conveyed to a requestor from which the hybrid query was received.

6 Claims, 9 Drawing Sheets

Voxel-Level Semantics 190
    Appearance (Color)
    Spectral Signature (MSI, HSI)
    Material Composition

Feature-Level Semantics 192
    Feature Identifier
    Feature Type
    Feature Attributes
        Physical Dimensions
        Geographic Name(s)
        Functional Usage

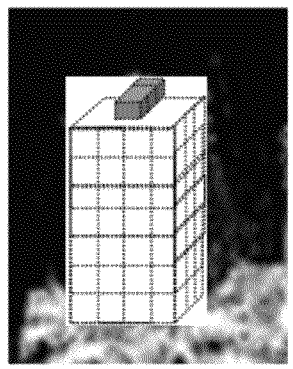
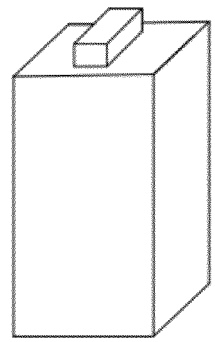

Many voxels relate to one feature

1..*  ⟷  1

Bi-directional navigability

Docket No. IS-00225CON

"I am *part of* a ..."
"*I am* made of ..."
"My appearance is ..."

"*I am* a..."
"*My components* are made of"
"My dimensions are ..."

FIG. 1B

Diagram 195

INDEXING BETWEEN VOXEL AND FEATURE DATABASES

Every Feature has a volumetric outline (envelope) which encloses one or more voxels Voxel Data Image 196                     Feature Data Image 197

Hybrid Table 198

| FID | Feature Type | Length | Width | Height | Material Type | Geometry |
|-----|--------------|--------|-------|--------|---------------|----------|
| 0   | A/C Unit     | 6m     | 3m    | 2m     | 95% Steel     |          |
| 1   | Building     | 10m    | 10m   | 50m    | 60% Concrete  |          |

Voxel Table 310

| VID | SID | SAttri1_Lower | SAttri1_Upper | SAttri2_Lower | SAttri2_Upper ... |
|-----|-----|---------------|---------------|---------------|-------------------|
| 1   | 1   | M1L VAL       | M1U VAL       | M2L VAL       | M2U VAL           |
| 2   | 1   | N1L VAL       | N1U VAL       | N2L VAL       | N2U VAL           |
| 3   | 2   | O1L VAL       | O1U VAL       | O2L VAL       | O2U VAL           |
| 4   | 3   | P1L VAL       | P1U VAL       | P2L VAL       | P2U VAL           |
| 5   | 3   | Q1L VAL       | Q1U VAL       | Q2L VAL       | Q2U VAL           |

Shape 3D Table 328

| SID | FID | Type     | X | Y | Z | * | * | * |
|-----|-----|----------|---|---|---|---|---|---|
| 1   | 1   | Box      | * | * | * | * | * | * |
| 2   | 2   | *Box*    | * | * | * | * | * | * |
| 3   | 2   | *Box*    | * | * | * | * | * | * |
| 4   | 2   | *Box*    | * | * | * | * | * | * |
| 5   | 3   | Box      | * | * | * | * | * | * |
| 6   | 4   | Cylinder | * | * | * | * | * | * |
| 7   | 4   | Cylinder | * | * | * | * | * | * |
| 8   | 4   | Cylinder | * | * | * | * | * | * |
| 9   | 4   | Cylinder | * | * | * | * | * | * |
| 10  | 5   | Cylinder | * | * | * | * | * | * |
| 11  | 5   | Cylinder | * | * | * | * | * | * |

Building Feature Table 332

| FID | Name              | Address                  | * | * | * |
|-----|-------------------|--------------------------|---|---|---|
| 1   | RI Hospital Trust | 123 4th St               | * | * | * |
| 2   | *Kennedy Plaza*   | *567 8th Ave*            | * | * | * |
| 3   | Webster Bank      | 91011 th Pl              | * | * | * |

Tree-Grove Feature Table 332

| FID | Name          | Genus     | Specific Attr | Specific Attr | Specific Attr |
|-----|---------------|-----------|---------------|---------------|---------------|
| 4   | Kennedy Park  | Conifer   | *             | *             | *             |
| 5   | Market Square | Deciduous | *             | *             | *             |
| 99  |               |           | Specific Attr |               |               |
| 199 |               |           | Specific Attr |               |               |
| 999 |               |           | Specific Attr |               |               |

FIG. 3A

QUERY SYSTEM FOR A HYBRID VOXEL AND FEATURE DATABASE

CROSS-REFERENCE TO RELATED APPLICATIONS

This application is a continuation of U.S. application Ser. No. 12/707,204 filed Feb. 17, 2010, now issued as U.S. Pat. No. 8,176,053 on May 8, 2012, and incorporated herein by reference in its entirety.

BACKGROUND

The present disclosure relates to the field of hybrid databases, and, more particularly, to a query system for a geospatial hybrid database that stores feature characteristics and volumetric attributes.

A geographic information system (GIS), or geographical information system captures, stores, analyzes, manages, and presents data that are linked to location. GISs represent a merging of cartography and database technologies. GIS databases record information using raster and vector based methodologies. Traditional GIS databases maintain records and record specific attributes in a vector based manner. That is, a set of discrete records for GIS objects are maintained. Attributes for these records are indexed against these discrete objects, in accordance with standard database techniques. For example, records of a traditional GIS database are indexed and normalized, often in third normal form (3NF).

Conventional GIS systems can store information in a raster and a vector based manner. In these systems, raw non-indexed visual data (e.g., raster based images) are typically maintained in a GIS as binary large objects (BLOB). Each BLOB generally represents a unique intelligence product that has been received. Analytics are performed against each BLOB. For example, a satellite image map can be converted to a vector structure by identifying adjacent cells with similar characteristics such as color intensity, generating vector regions for these cells, then converting regions into point, linear, or arial features. It is generally believed that there is a fundamental incompatibility between raster and vector based storage methodologies, which requires a GIS to be able to convert data from one structure to another. Specifically, data that is to be indexed and searched based on semantics is generally converted from a raster based storage format to a vector based one.

Conventional wisdom regarding vector based storage formats is that they require significant less overall storage space, are simpler to update and maintain than raster based storage, and that vector based storage allows for more analysis capability than raster based storage mechanisms. It is believed, as will be described herein, conventional wisdom assumptions regarding vector based storage benefits versus raster based storage are mistaken.

BRIEF SUMMARY

The disclosure is for a hybrid database that stores some geospatial information in voxel records (a raster based storage format) and other geospatial information in a feature records (a vector based storage format). Indexes are maintained between the voxel records and the feature records. Each feature is associated with a volumetric envelope formed from one or more primitive shapes that together approximate an output volumetric boundary of the envelope-enclosed feature. In the hybrid database, higher order attributes (which can be referred to as feature-level semantics) unique to the feature as a whole are stored in vector format in the feature records. Lower order attributes (which can be referred to as voxel-level semantics), which are not uniformly true for the envelope-enclosed feature, are stored in the voxel database in raster format. Stated differently, attributes pertaining to the entire geospatial envelope (a unique feature or real-world object), are stored in the feature records. Attributes pertaining to subcomponents of the geospatial envelope or to specific points of the interior of the volumetric defined space are stored in the raster form in the voxel records.

The hybrid database can include a hybrid intake engine, which processes incoming information from a real-world space in accordance with internal rules. After processing, some portions of the incoming information will be stored in feature records while other portions will be stored in voxel records. A minimal amount of redundancy will exist in the hybrid database, as different attribute types map to different portions of the hybrid database (feature-level attributes mapping to specific features—volumetric space or voxel-level attributes mapping to specific voxels). The hybrid database can also include a hybrid query engine, which is able to respond to hybrid queries which have both feature-based and voxel-based elements. That is, portions of data are extracted from the feature database and other portions are extracted from the voxel records in response to a hybrid query. A fact that a hybrid query produces results from both a raster format space (voxel database) and a vector formatted space (feature database) can be transparent to an end-user issuing the hybrid query and receiving a hybrid query response.

In one aspect of the disclosure, a hybrid database can receive a hybrid query for an object having a real world analog. A feature of a feature database can be determined that corresponds to the object. Feature-level attribute values of the feature can be extracted from the feature database. A volumetric envelope forming an outer boundary of the feature in a volumetric storage space of the hybrid database can be determined. A set of uniquely indexed voxels can be determined. Each voxel can be a volumetric unit of the volumetric storage space that represents the volume contained by the volumetric envelope. Voxel-level semantic values can be extracted from the set of uniquely indexed voxels from a voxel database. Extracted voxel-level semantic values and extracted feature-level attribute values can be combined to generate a hybrid result. The hybrid result can be conveyed to a requestor from which the hybrid query was received.

In one aspect of the disclosure, sensors can capture raw data that geospatially corresponds to a real world volumetric space. The real-world volumetric space can be segmented into a set of regular volumetric units, where datum of the raw data is indexed against the regular volumetric units. Each regular volumetric unit of the real-world volumetric space can be mapped to a voxel in a storage volumetric space. Semantic content of the raw data can be bifurcated into voxel-level semantic content and feature-level semantic content. Voxel-level semantic content of the raw data can be stored in a voxel database of a hybrid database. The voxel-level semantic content can be contained in attributes of records having a unique voxel identifier. Feature-level semantic content of the raw data can be stored in a feature database of a hybrid database. The feature-level semantic content can be contained in attributes of records having a unique feature identifier.

One aspect of the disclosure is for a hybrid database for geospatial data. The hybrid database can include voxel records, feature records, and a hybrid query engine. The voxel records can have a unique voxel identifier. The voxel records can store information in a storage volumetric space comprising a plurality of voxels. The storage volumetric space can correspond to a real-world volumetric space that includes real-world volumetric units. A correspondence can exist between voxels and real-world volumetric units. The feature records can each represent a tangible object. Each feature record can comprises a unique feature identifier. Each feature of the feature records can have a three dimensional outer boundary defined by an envelope. The envelope can equate to a defined volume of the storage volumetric space. The envelope can be directly mapped to a plurality of voxels in the voxel records. The hybrid query engine can receive information hybrid queries conveyed to the hybrid database. It can query content stored in both the voxel records and feature records to generate a hybrid result for the hybrid queries. It can then provide the hybrid result to a requestor. An interface between the hybrid database and the requestor can be a unified interface that abstracts specifics that queries handled by the hybrid query engine are processed by two different types of records, which are the voxel records and the feature records.

Another aspect of the disclosure is for a database for storing probabilistic geospatially referenced information within an indexed tangible storage medium. The database can include voxel records, feature records, and shape records. The voxel records can be stored in a voxel table, where each of the records has a unique voxel identifier. Each voxel record can include voxel-level semantic attributes for the geometric space. Voxel-level semantic attributes can include appearance attributes, spectral signature attributes, and material composition attributes. The feature records can be stored in one or more feature tables. Each of the feature record can include feature-level semantic attributes, which include a unique feature identifier, a feature type, and a set of feature attributes. Feature attributes can include physical dimensions of a related feature, a geographic name of a location of the feature, and at least one functional usage attribute for the feature. Each feature associated with a unique feature identifier can correspond to a real world object. The shape records can be stored in a shape table. Each of the shape records can include a unique shape identifier, a shape type, a set of shape attributes, and a foreign key to a feature identifier. Types of shapes are primitive shapes that comprise a box, a cylinder, a sphere, and a cone. A one-to-many relationship can exist between features and shapes. Each record of the voxel table can include a foreign key to a shape identifier, wherein a one-to-many relationship exists between voxels and primitive shapes.

BRIEF DESCRIPTION OF THE SEVERAL VIEWS OF THE DRAWINGS

FIG. 1B is a schematic diagram distinguishing between voxel-level and feature-level semantics in accordance with an embodiment of the disclosure.

FIG. 3A illustrates a set of tables for a hybrid database in accordance with an embodiment of the disclosure.

DETAILED DESCRIPTION

Figure 1A:
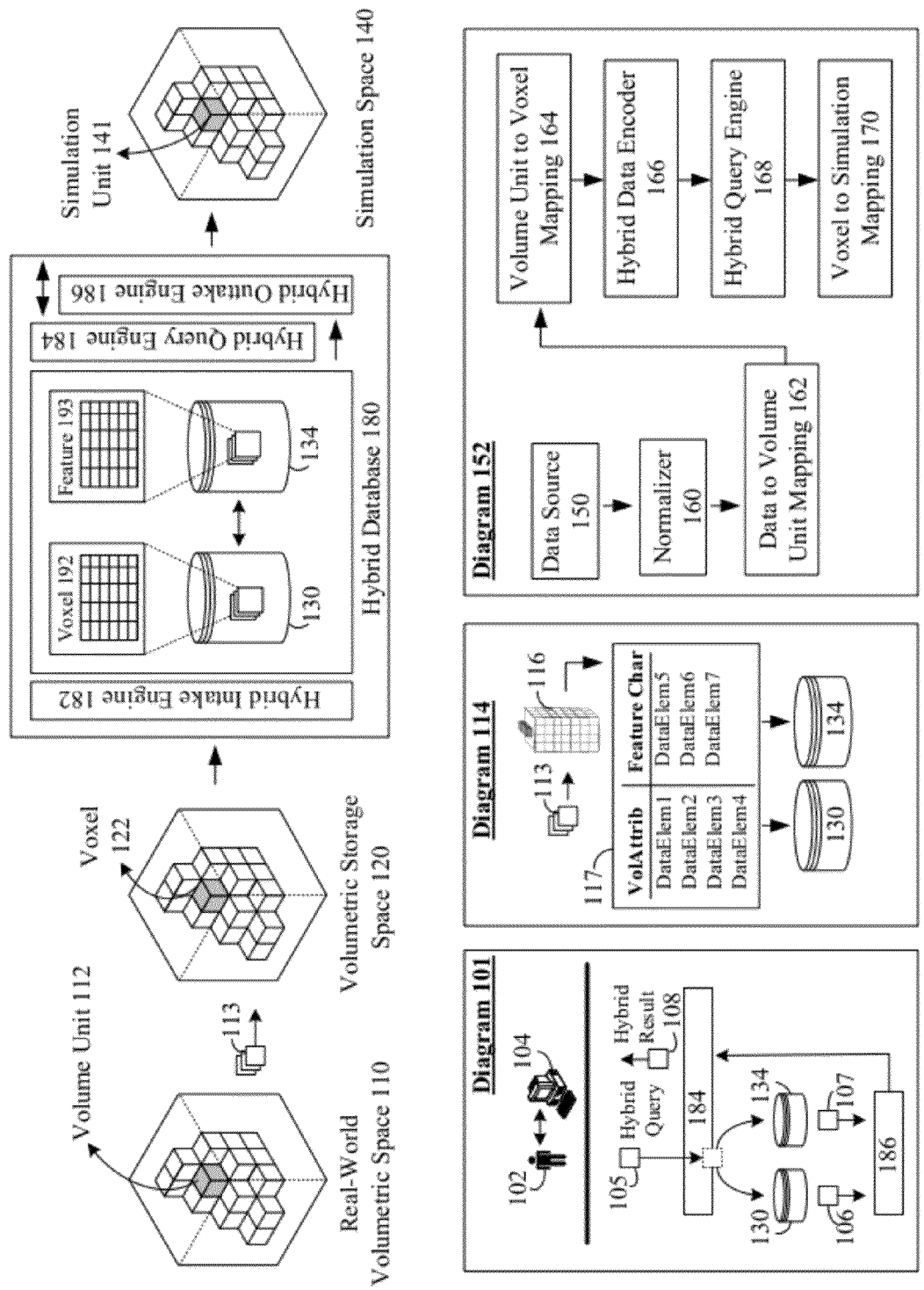
FIG. 1A is a schematic diagram showing a geospatial hybrid database in accordance with an embodiment of the disclosure.

The disclosure provides a volumetric storage space 120 of a voxel database, having a unified query system that queries attributes of voxel records and feature records. The volumetric storage space 120 can be a space composed of a set of volumetric units, called voxels 122. Data elements can be directly referenced to voxels 122, which permits these data elements to be spatially placed in the volumetric storage space 120. The data elements need not have any specific identity outside their relationship to the voxels 122, which permits raw data to be inserted into the volumetric storage space 120. For example, satellite imagery, LIDAR points, and other information can all be inserted into the volumetric storage space 120 and referenced to voxels 122. Viewed in one manner, each voxel 122 can be thought of as a three dimensional puzzle piece that fits together with other puzzle pieces to form the volumetric storage space 120. Information included in the volumetric storage space 120 can be extracted post-storage. For example, outlines of objects can be detected within the volumetric storage space 120 to determine a presence or absence of a building, vehicle, crowd, or other object within the volumetric storage space 120.

It should be noted that data elements can be continuously inserted into the volumetric storage space 120. In this manner, data elements can be combined to continuously increase a "resolution" of the data image contained within the volumetric storage space 120. In one embodiment, the volumetric storage space 120 can be a probabilistic one. In other words, data elements can be stored in the volumetric storage space 120 that have a probability of being contained therein but have a probability of not actually being contained therein. For example, if an incomplete "data image" of a building (which can be formed by 1 . . . N quantity of voxels) exists in the volumetric storage space 120, an associated probability of the building being present in the volumetric storage space 120 can be at a value of forty percent where a sixty percent probability value exists that the building is not present in the volumetric storage space 120. Thus, the volumetric storage space 120 is able to handle uncertainty of data elements in a manner that traditional storage spaces cannot. Probabilities can also apply to social characteristics and cultural conditions determined by processing data of the volumetric storage space 120.

The volumetric storage space 120 can store data elements of any nature. For example, the data elements of the volumetric storage space 120 can include visual information in two or three dimensions. Data elements can also include material composition elements, elevation data, and the like. Any type of information that can be spatially related to a volumetric unit (e.g., voxel) can be stored in the volumetric storage space 120.

Another way of expressing the volumetric storage space 120 is by using database terminology. Stated differently, each voxel 122 can have a unique identifier, which in a database system (e.g., database 130) can be a primary key of a database table having voxel records. Data elements of the volumetric storage space 120 can be attributes of the voxel records.

Relative reference points of data elements within a corresponding voxel can be optionally recorded, should a spatial positioning of a data element be needed at a level of granularity less than a single voxel 122. The only linkage of each data element within the database 130 can be defined by its relationship to a voxel 122. That is, instead of referencing visual, material, or other characteristics of a building to that building, as would be the case with a standard database—visual, material, or other characteristics can be referenced directly to voxels 122.

This ability to relate any number of characteristics (e.g., data elements) having a spatial component to the volumetric storage space 120 at a suitable spatial location (via voxel referencing) is significant and unique to a voxel database 130. It is this ability that permits "raw" data to be directly inserted into the volumetric storage space 120. The raw data (e.g., satellite data, for example) when acquired is typically formatted in a spatial manner well suited for proper insertion into the volumetric storage space 120. Otherwise, input acquired from satellites (or similar sources) must be processed and categorized to specific objects (e.g., buildings, roads, etc). These objects are typically stored in databases as discrete entities having object specific attributes. Each time processing occurs, a data loss can result, as assumptions, which must be made during processing, may not be true. For example, during processing, material composition attributes are historically stored against to objects (e.g., buildings, roads, etc.) formed from these materials. There may be, however, uncertainty in which of a set of possible objects are actually present in a given spatial region. Thus, during processing, material composition attributes can be stored against the wrong objects. Conventional practices (that do not utilize a volumetric storage space 120) may attempt to correct for processing errors, as described above. Error correction techniques, however, do not change the fact that there is a fundamental disconnect with the paradigm used for storing data given the manner in which this data is acquired. Use of a volumetric storage space 120 is believed to resolve this disconnect, and believed to achieve numerous advantages as described herein.

FIG. 1A shows a hybrid database 180 for storing geospatial data in accordance with an embodiment of the inventive arrangements disclosed herein. The hybrid database 180 stores some geospatially referenced information in voxel records 130 and stores other geospatially referenced information in feature records 134. The voxel records 130 can define a volumetric storage space 120, which is a volumetric space comprised of unique volumetric units, which are voxels 122. Voxels 122 associated information can be stored in voxel table 192, which has a unique identifier for each unique voxel 122. In one embodiment, the real-world volumetric space 110 and units 112 therein can directly correspond to the storage volumetric space 120 and its units 122.

The storage space 120 can also be mapped to a simulation space 140, which is comprised of simulation units 141 (unique volumetric units of simulation space) that map to voxels 122. The simulation space 140 can be a space that a simulator uses to create a representation of the real-world volumetric space 110, which may be an interactive representation. The voxel records 130 can geospatially store information (indexed against unique voxels) in a raster format. Appreciably, the voxel records 130 can inherently store data in a probabilistic manner, as conflicting information from different sources 150 can be combined into a three dimensional volumetric space 120 that corresponds to a three dimensional real-world space 110.

In contrast, the feature records 134 can store information in a vector format. Each feature of the feature records 134 can include a unique identifier for a feature, which is a type of real-world object. In one embodiment, feature specific object datum elements (e.g., feature characteristics) can be associated with certainty qualifiers, which indicate a degree of certainty to which the information is known. To distinguish the two, the probabilities of an item being certain in voxel records 130 can be dynamically computed based upon conflicting information of the records 130. In feature records 134 probabilistic data (if any) is recorded as a value to an otherwise non-probabilistic discrete data element. As new information is incorporated into voxel records 130, inherent probabilities of data certainty can change. Changing probabilities of feature records 134 certainty values requires an explicit changing of a value associated with an otherwise deterministic record.

In the feature records 134, different types of real world objects can be equated to different types of features, where each type of feature can have a unique table (feature table 193) associated with it. Thus, feature records 134 can include a multitude of different feature tables 193. For example, a tree can be a type of feature having a unique record in a tree table (one type of feature table). A building can be a type of feature having a unique record in a building table (another type of feature table). Different types of features can have different associated attributes and values, which permits different types of semantic data to be stored for the different feature types (i.e., trees and buildings are different from each other—searchable attributes recorded for each are expected to differ in a corresponding manner). A volume in storage space 120 occupied by a feature can be defined by a volumetric envelope (see envelope 234 of FIG. 2, for an example). The volumetric envelope can be composed of one or more shape primitives (see shapes 250 and 252 of FIG. 2, for an example). Shape primitives can be a set of basic volumetric shapes that are easily defined by a relatively small number of numeric parameters.

FIG. 1B provides a diagram useful for distinguishing between voxel record content and feature record content. As shown, voxel-level semantics 190 can include visual attributes (color, contrast, intensity, brightness), spectral signature attributes (Multispectral Imaging (MSI), Hyperspectral Imaging (HSI)), material composition attributes, and the like. Voxel-level semantics 190 (e.g., data stored in voxel database 130) indicate that a data element "is part of a . . . "; "is made of . . . "; and/or "has an appearance of . . . " something.

Feature-level semantics 192 can include a feature identifier, a feature type, and feature attributes, such a physical dimensions, geographic names, functional usage information, and the like. Feature-level semantics 192 (e.g., data stored in feature database 134) indicate that a data element "is a . . . "; "has identifiable components consisting of . . . "; "has feature specific attributes of . . . "; and/or "has dimensions of . . . " something.

Each feature of the feature records 134 can occupy a unique volume of volumetric space 120, which corresponds to a set of unique voxels 122 of the voxel database 130.

In one embodiment, a hybrid query engine 184 and hybrid outtake engine 186 can combine to permit uniform querying of the hybrid database 180. That is (as shown by diagram 101 of FIG. 1A), a user 102 of a computer device 104 can issue a hybrid query 105. The hybrid query 105 can be processed by the hybrid query engine 184, where it is bifurcated into at least one voxel query and into at least one feature query. The voxel query can be a query submitted to voxel records 130, which results produces voxel results 106. The feature query can be a query submitted to feature records 134, which produces feature results 107. The hybrid outtake engine 186 can combine results 106, 107 to create hybrid response 108. User 102 is able to issue their hybrid queries 105 to the hybrid database 180 without being aware (i.e., the hybrid querying process can be user 102 transparent) that database 180 stores some data in a vector based format and other data in a raster based format.

Figure 1C:
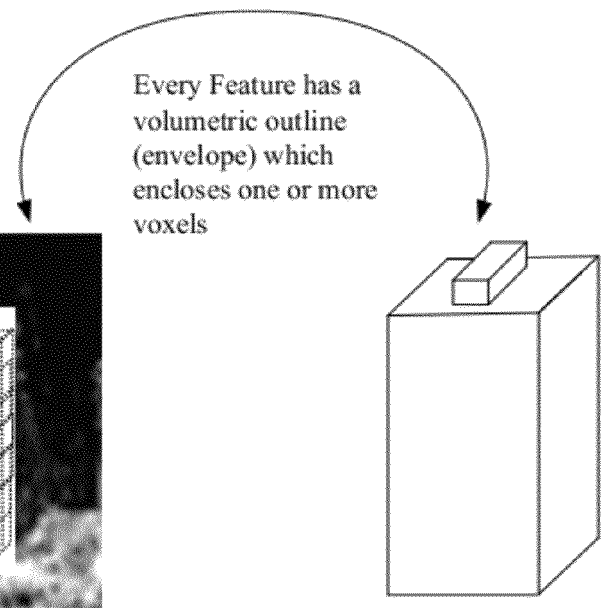
FIG. 1C is a diagram showing a hybrid table and indexing between a voxel records and a feature records in accordance with an embodiment of the disclosure.

FIG. 1C shows a diagram 195 for indexing between voxels and features in accordance with one embodiment of the disclosure. Diagram 195 is a simplified embodiment shown to clarify the underlying concepts and is not to be construed as limiting implementation details related to hybrid database 180 (or engines 184, 186). In diagram 195, data image 196 represents an image of a data set from the voxel records 130. Data image 197 is an image of a corresponding data set from the feature database 134.

Hybrid attribute table 198 represents a table including combined information from records 130 and 134, which is relevant for a given query (e.g., query 105). As shown in table 198, each record is a feature record having a unique feature identifier. Feature type, length, width, and height attributes can be obtained from records 134 (feature data image 197) data. The material type attribute can be dynamically determined from information of voxel records 130 (voxel data image 196) data. Use of the hybrid attribute table 198 can permit a hybrid query 105 (which can be a structure query based query) to be directly performed to produce response 108. That is, the actual query 105 need not be bifurcated into two separates queries, which produce results 106, 107, which are later combined.

A different hybrid attribute table (not shown) could be constructed that is indexed by voxels, where feature specific information is incorporated. Thus, the combining of data between different databases 130, 134 and data sets (196, 197) is bidirectional.

Turning back to FIG. 1A, the hybrid intake engine 182 can perform overhead and processing actions during information acquisition phases so that data sources 150 treat hybrid database 180 similar to a standard information repository. As shown by diagram 114, incoming data 113 can contain semantic content that includes voxel-level semantics 190 and feature-level semantics 192 (shown in diagram 114 as hybrid data set image 116). Hybrid intake engine 182 can separate content of data 113 into volumetric attributes and feature characteristics, shown by bifurcated data set 117. Volumetric attributes of data 113 can be those holding values for voxel-level semantics 190, which are stored in voxel records 130. Feature characteristics of data 113 can be those holding values for feature-level semantics 192, which are stored in feature records 134.

Diagram 152 shows an end-to-end process of converting data of real-world space 110 to storage space 120 to simulation space 140. For a given geographic region, one or more data sources 150 can utilize a set of sensors to capture and record data 113 for a specific set of volume units 112. Before converting data 113 into hybrid database 180 mapped records, the data 113 can be optionally normalized (by normalizer 160) to a definable standard. A data to volume mapping unit 162 can determine which unit 112 data 113 elements correspond to, should geospatial referencing be needed. Then, volume unit to voxel mapping component 164 can determine which voxel 122 corresponds to which volume unit 112. A hybrid data encoder (of hybrid intake engine 182) can store the data 113 in hybrid database, which includes placing voxel-level semantics in voxel records 130 and feature-level semantics in feature records 134.

Hybrid query engine 184 and outtake engine 186 can extract data from hybrid database 180. Results 108 from engines 184, 186 can be geospatially related, which permits a mapping of the results to simulation space on a unit-by-unit basis. Thus, in one embodiment, data associated with a voxel unit 122 can be mapped to a corresponding simulation unit 141.

Figure 2:
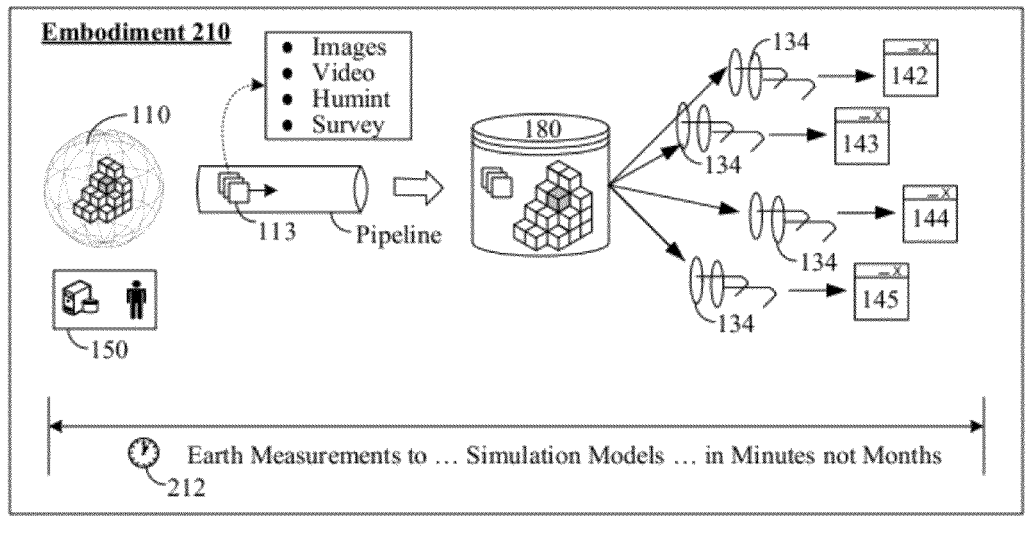
FIG. 2 describes an embodiment for populating and using a hybrid database and showing a relationship between envelopes, features, and voxels.
Figure 2:
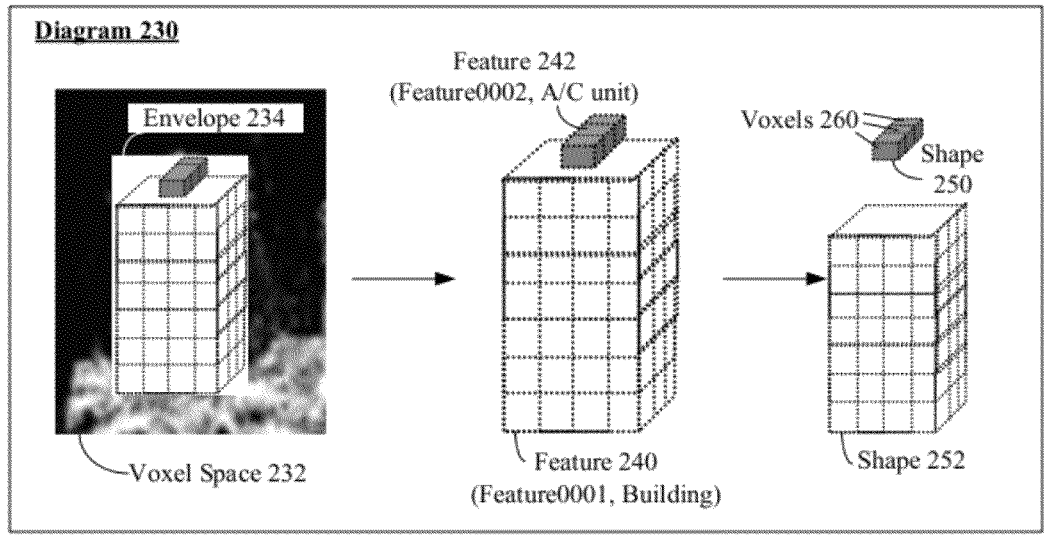

Embodiment 210 of FIG. 2 provides another description for populating and using hybrid database 180. It also emphasizes that the database 180 can function as a central repository for a myriad of different types of data. Using embodiment 210 as a description reference, data (including data 113) captured from a real-world volumetric space 110 can be conveyed over a single pipeline to hybrid database 180. The data 113 can come from many sources 150, such as satellite imagery, digital elevation model (DEM) data, video, signals intelligence (SIGINT), human intelligence (HUMINT), and the like. Additionally, the hybrid database 180 can provide data for multiple different types of simulators (simulation space 140). In one embodiment, simulator specific filters 134 can be used to customize hybrid database 180 output for a use by a specific simulator. For example, behavioral simulations 142, tactical engagement simulators (TES) 143, constructive simulators 144, immersion simulators 145, vehicle simulators, and the like can all be operate on hybrid database 180 stored records.

The hybrid database 180 product can be a probabilistic one in which uncertainty is handled. In one embodiment, query engine 184 can include multiple different components for producing different queries (e.g., mission rehearsal query, training query, analysis query, etc.), which handle uncertainty in different manners for different types of consumers. It should be appreciated that embodiment 210 can be largely automated, which permits the process 212 from taking measurements, to producing simulation models to occur within minutes and not months, as is the case with conventional information gathering and modeling processes.

Diagram 230 provides an illustrated example for describing features. In diagram 230, an envelope 234 of a voxel sub-space 232 can contain features 240 and 242. Feature 240 can be uniquely identified as Feature0001, which is a feature identifier. The feature type of feature 240 can be a building. Feature 242 can be an air conditioning unit positioned on top of the building. As shown, each feature 240, 242 is formed from single shape primitives 250 and 252, which are both boxes. Features can include any number (from 1 to N) of shape primitives. Each shape can include (be mapped to) a set of voxels. For example, three voxels 260 can form shape 250. In one embodiment, the hybrid database 180 can include software implemented tools to automatically detect and define shapes, features, and envelopes in a given raster-based storage space or subspace.

While any number of shape primitives can be supported by hybrid database 180, some common shape primitives include boxes, cylinders, spheres, and cones.

In one embodiment, shape primitives used by hybrid database 180 can conform to existing standards for enhanced compatibility. For example, shape primitives can conform to Open Graphics Library (OpenGL) standards for 3D computer graphics. In one embodiment, Coin3D, which is a C++ object oriented retained mode 3D graphics Application Program Interface (API) used to provide a higher layer of programming for OpenGL, objects can be mapped to shape primitives as follows: a box equates to a SoCube; a cylinder equates to a SoCylinder; a sphere equates to a SoSphere; and, a cone equates to a SoCone. In another embodiment, mappings to geospatial scheme of the National Geospatial-Intelligence Agency (NGA) can be as follows: a box equates to a RectangularPrism; a cylinder equates to a Vertical Cylindrical; a sphere equates to a spherical; and, a cone can have no equivalent. In still another embodiment, mappings to a computer aided design (CAD) scheme can be as follows: a box equates to an Axis Aligned Bounding Box (AABB); a cylinder equates to a Cylinder, Flat Ends; and, a sphere equates to a Cylinder, Round Ends, Zero Length/.

Figure 3B:
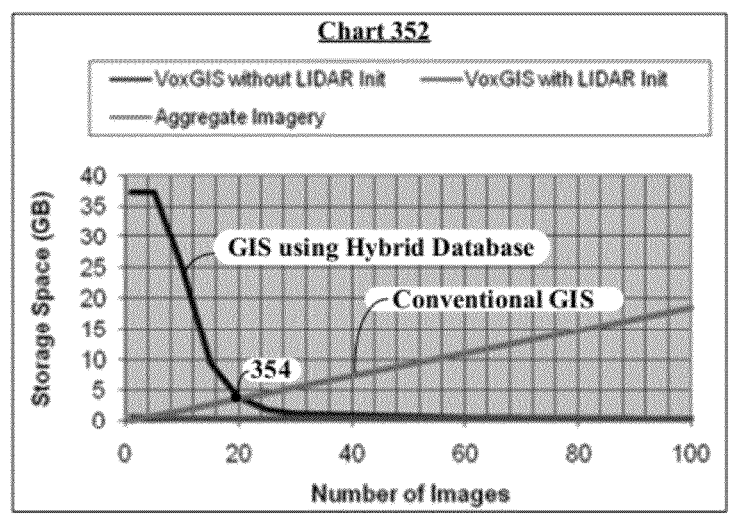
FIG. 3B demonstrates aggregation efficiency of a hybrid database in accordance with an embodiment of the disclosure.
Figure 3B:
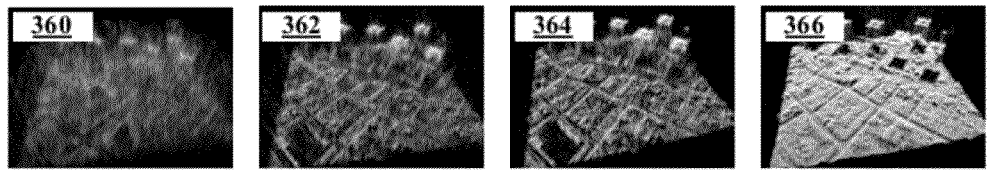

FIG. 3A illustrates a set of tables 310, 320, 330, 340 for a hybrid database 180 in accordance with an embodiment of the disclosure. In one embodiment, the tables 310, 320, 330, 340 can be RDBMS tables in third normal form. This format is expressed in FIG. 3A for convenience and is not to be construed as a limitation on the scope of the disclosure. As shown, the tables 310, 320, 330, 340 can include a plurality of records.

Voxel table 310 (which stores voxel-level semantics 190) includes a VID 312, which is a unique identifier for each voxel. SID 313 can be a unique identifier for a shape primitive which forms all or part of a shape envelope. Any quantity (1 . . . N) of attributes can be associated with each unique voxel of table 310.

In one embodiment, certainty qualifiers can be placed on attributes of the tables 310, 320, 330, 340, which can indicate a probability of that attribute accurately reflecting a real-world state. This can be true for not only vector-based data sets (those of feature tables 330, 340) but also for raster-based data sets (those of voxel table 310). Thus, voxel table 310 records can be encoded in a doubly probabilistic fashion. First, the information of table 310 can be internally inconsistent, because different data sources can report geospatial differences in different manners. Next, each recorded element can have an associated probability for when a single consistent data source notes an existence of a probability of a discrete reported data element.

To account for the second type of uncertainty, each attribute 314, 316 in the voxel table 310 can have at least two values, such as a lower value and an upper value. The multiple values can be used to record different levels of certainty for each attribute 314, 316. For example, one source can report a first value of an attribute 314, 316 with a definable degree of certainty and a different value can be reported for the same attribute 314, 316 with a different degree of certainty. Although two values (lower and upper) are shown for each attribute 314, 316, any number of values (1 . . . N) can be used in table 310.

Table 330 and 340 can also include specific attribute 314, 316 values for uncertainty. In the feature tables 330, 340 this uncertainty can have a single nature, and can even reflect an uncertainty derived from the inherent uncertainty of raster stored data (due to inconsistent data being stored in a raster space) combined with a second probability value, such as from values of attributes 314 and 316.

Each record in shape table 320 can include a unique shape identifier, SID 322. A secondary key for a feature ID 324 can also be included. Table 320 can also include a type 326 attribute. A set (0 . . . N) of additional shape specific attributes 328 can also exist.

Each unique feature can be associated with a feature identifier, FID 332. In one implementation, different types of tables 330, 340 can exist, one for each unique category or type of object, which corresponds to a feature. For example, one table 330 can exist for buildings and another table 340 can exist for tree groves. Each table 330, 340 can have an associated set of attributes 334, 344, which are unique to a specific type of object. It should be appreciated that arrangements of tables 310, 320, 330, 340 are presented to illustrate a concept expressed herein and are not to be construed as a limitation of the disclosure.

Diagram 350 (shown in FIG. 3B) illustrates how voxel database 130 is able to efficiently aggregate information. This aggregation efficiency actually accelerates as information density increases. For example, as a number of images encoded within voxel database 130 increases, storage requirements can actually decrease (or at least become more efficient than the straight line increase experienced using a pure traditional vector-based GIS). Aggregation efficiency results from the "holographic-like" nature of voxel storage space, where an increase in information density increases clarity of the storage space 120. Uncertainty is reduced, which can reduce storage requirements (e.g., decreasing overhead needed for maintaining "noise" or abnormal data points in storage space 120).

Aggregation efficiency of the voxel database 130 is represented in diagram 350 by a set of images 360-366 of a stored volumetric space. The images 360-366 are static geospatial images of real-world terrain taken from satellite images, yet the demonstrated principle is consistent regardless of the specific input being encoded in a volumetric storage space.

Image 360 shows a visual depiction of a raster-based storage space formed from ten images. Image 362 shows the same storage space after 20 images have been processed. Image 364 shows the storage space after 30 images. Image 366 shows same storage space, that has been refined using LIDAR points in conjunction with the thirty images. As shown, it becomes evident that an increase in information density decreases uncertainty of an encoded raster-based storage space and increases "fidelity" of the stored information. That is, as information density increases surface probabilities become better defined. More voxels (and associated data) in "empty space" can be discarded.

It can be mathematically shown that as information density approaches infinity, storage space requirements for the voxel database 130 approaches (effectively equals) a theoretical minimal storage space required by the imagery (and/or data elements being stored). At relatively low information densities (compared to that currently being handled by intelligence agencies) a cross-over point 354 occurs, where it is more efficient to store equivalent data within voxel records 130 than it is to store equivalent data in a non-voxel database (e.g., a conventional raster or image based storage medium). Post cross-over point 354 voxel records 130 storage space advantages continue to increase, as shown by chart 352. It should be noted that although many examples presented herein are in context of intelligence activities, voxel records 130 aggregation efficiencies and techniques are domain independent can be used for any geospatial data set.

Figure 4A:
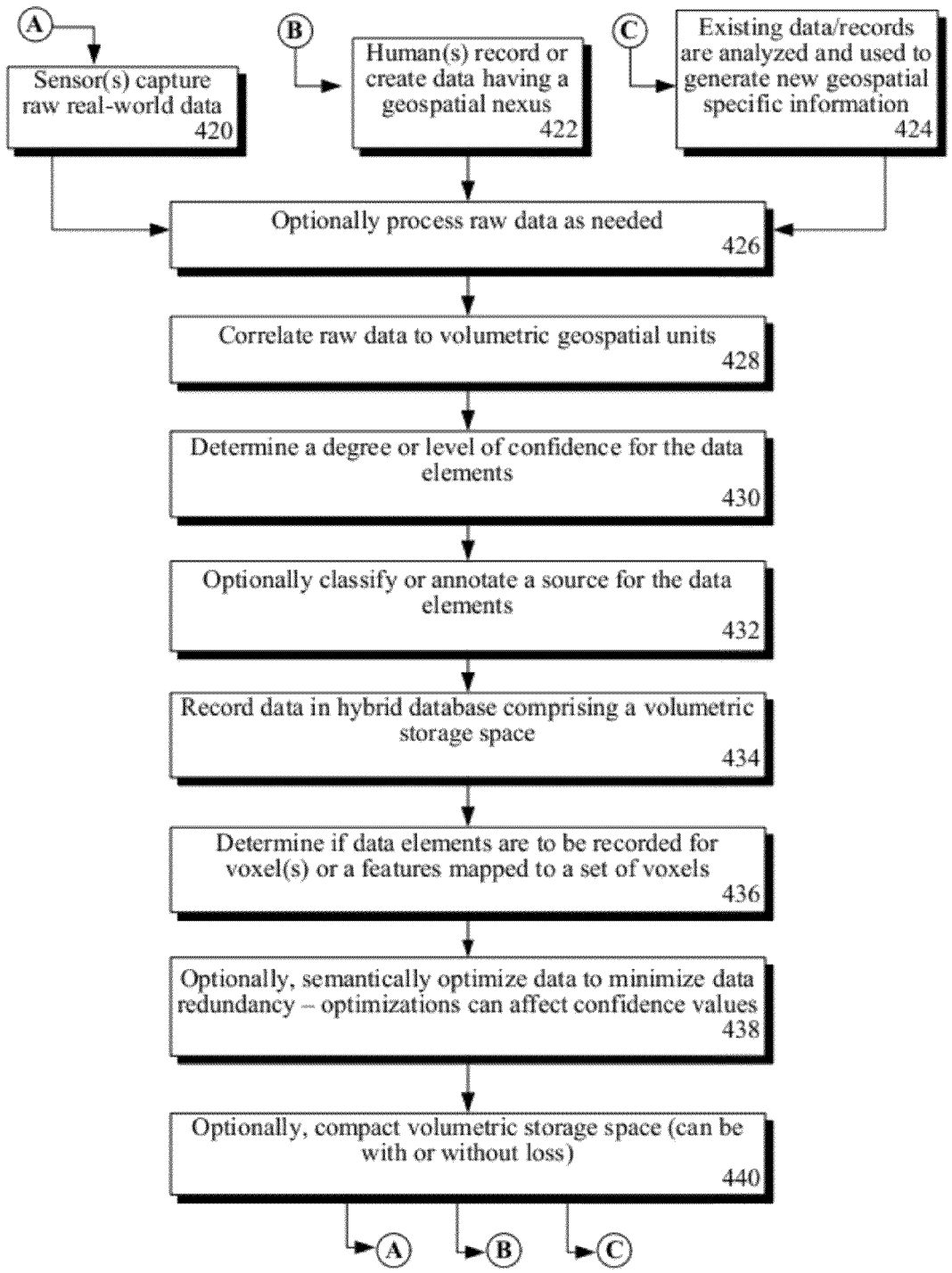
FIG. 4A is a flow chart of a process to acquire hybrid database information from a data source in accordance with an embodiment of disclosure.

FIG. 4A shows a process 410 to acquire voxel database 430 information from a data source 150 in accordance with an embodiment of disclosure. In process 410 data can be continuously received from a variety of sources, which include completely automated data capture sources (step 420), human data sources (step 422), and generating new intelligence data (or other information) by analyzing and combining existing source data (step 424). This data can be continuously being handled by the process, as represented by process 410 proceeding from step 440 to steps 420, 422, and/or 424. In process 410, data acquisitions and processes can occur in real-time or after an appreciable delay (e.g., handled in batch) depending upon implementation choices. Further, process 410 actions can occur asynchronously/synchronously as well as cyclically/randomly/based on conditional events depending on contemplated implementation choices.

Regardless of how raw data is gathered (step 420, 422, or 424), the data can be optionally processed as needed, as shown by step 426. In step 428, the raw data can be correlated to volumetric geospatial units and/or to populations present in the units. For example, data can be mapped to absolute or relative points in geographic space. In step 430, a degree or level of confidence for the mapped data elements can be determined. In optional step 432, data elements can be classified in accordance to a source type and/or a specific data source can be tagged or otherwise related to the data elements.

The data elements can be recorded in a hybrid database 180 comprising a raster-based volumetric storage space voxel space (e.g., voxel database 130), as shown by step 434. When data elements are recorded in the hybrid database, a determination can be made as to whether each data element is to be referenced against a set of one or more voxels, against a defined feature, or both, as indicated by step 436. This decision can be based on whether the data being recorded includes voxel-level semantics 190 or feature-level semantic 192.

In optional step 438, data can be semantically optimized to minimize data redundancy. For example, approximately equivalent data from multiple sources can be combined into a common data element. This semantic combination can affect confidence values associated with a data element. For example, when multiple sources report a single data element consistently, a confidence value in that data element will increase. In optional step 440, a volumetric storage space can be compacted to minimize storage requirements. For example, different voxel (e.g., raster based) compaction algorithms can be utilized to minimize storage needs of voxel records 130, which include loss-less compaction algorithms and lossy compaction algorithms.

Figure 4B:
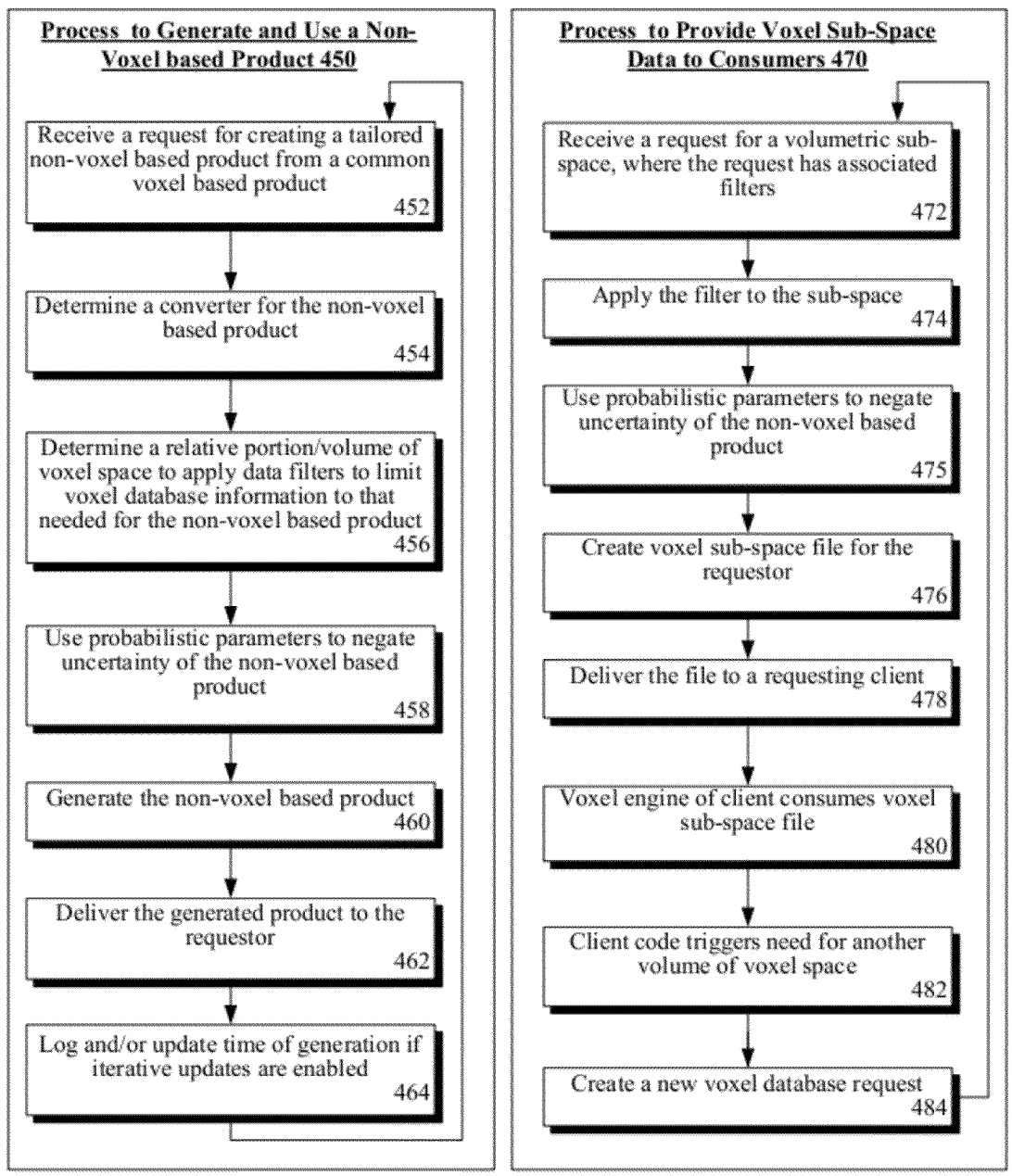
FIG. 4B is a set of flow charts for utilizing data of a hybrid database in accordance with an embodiment of disclosure.

The hybrid database 180 populated though a process, such as process 410, can thereafter be treated as a common repository or centralized source for geospatially related information. This centralized source can be utilized by different consumers in different ways. In one scenario (process 450 shown in FIG. 4B), the hybrid database can be used to generate a non-voxel based product. In another scenario (process 470 shown in FIG. 4B), the hybrid database can provide voxel-subspace data sets to requestors, which these requestors can consume directly utilizing an internal voxel engine.

Process 450 can begin in step 452, where a request is received by a hybrid database server. The request can be for creating a tailored non-voxel based product from a common voxel based product. An appropriate converter for the request can be determined in step 454.

In step 456, a relative portion or volume of storage space needs to be determined. That is, the request will rarely be for an entire volume region stored by the hybrid database, but will likely be for a volumetric subspace specifically needed by the non-voxel based product. Additionally, data within the requested volumetric subspace can be filtered by applied data filters, so that only the information needed for a specific product of the request is considered. In step 458, probabilistic parameters can be utilized to negate uncertainty inherent in the hybrid database when generating the non-voxel based product. Different thresholds and/or parameters can be utilized to determine what level of uncertainty is to be retained within the non-voxel based product, which is generated in step 460. The generated product can be delivered to the requestor in step 462.

Some generated products can require periodic updates form the hybrid database in order to retain information currency. In one embodiment, optimizations can be implemented so that only relatively new information needs to be considered for some update operations. When iterative updates are a concern, information can be logged and/or time attributes of the hybrid database can be updated as appropriate, which is shown by step 464. The process 450 can repeat as needed, which is expressed by proceeding from step 464 to step 452.

Process 470 can begin in step 472, where a request for a volumetric sub-space is received. The request can have a set of associated filters. Unlike process 450, it is contemplated that a requestor of process 470 can directly consume voxel encoded information. In step 474, the filter can be applied to the volumetric sub-space to conditionally exclude data of the hybrid database. This is important as the hybrid database can be a centralized repository that stores a myriad of data attributes, where only a subset of the data attributes are of concern for a specific requestor. In optional step 475, probabilistic parameters can be applied to negate uncertainty when generating the volumetric sub-space. This optional step 475 can be utilized when satisfying a request (step 472) for a non-probabilistic subspace.

In step 476, a file (or set of files) containing the requested information can be created. In step 478, the created file(s) can be delivered to a requesting client, such as by delivering the file(s) over a network. A voxel engine of the client can consume or utilize the sub-space file, as shown by step 480. In one embodiment, the hybrid database can be directly accessible and used by the clients, in which case a creation and utilization of a locally create file can be unnecessary.

In one embodiment, the sub-space files can be encoded in a local media storage area (e.g., hard drive) for use by a client as needed. This prevents a need for continuous and/or stable network connectively between the client and the hybrid database. In one embodiment, suitable sub-space laden files can be encoded in a portable medium (e.g., optical, magnetic, or other) and disseminated/located to clients periodically.

In another embodiment, data sets can be continuously requested by a client. That is, executing client code can trigger a need for another volume of storage space, as shown by step 482. When no local cache exists for this needed information, a new hybrid database request (submitted over a network) can be created, as shown by step 484, which results in the request being handled in step 472.

Figure 5:
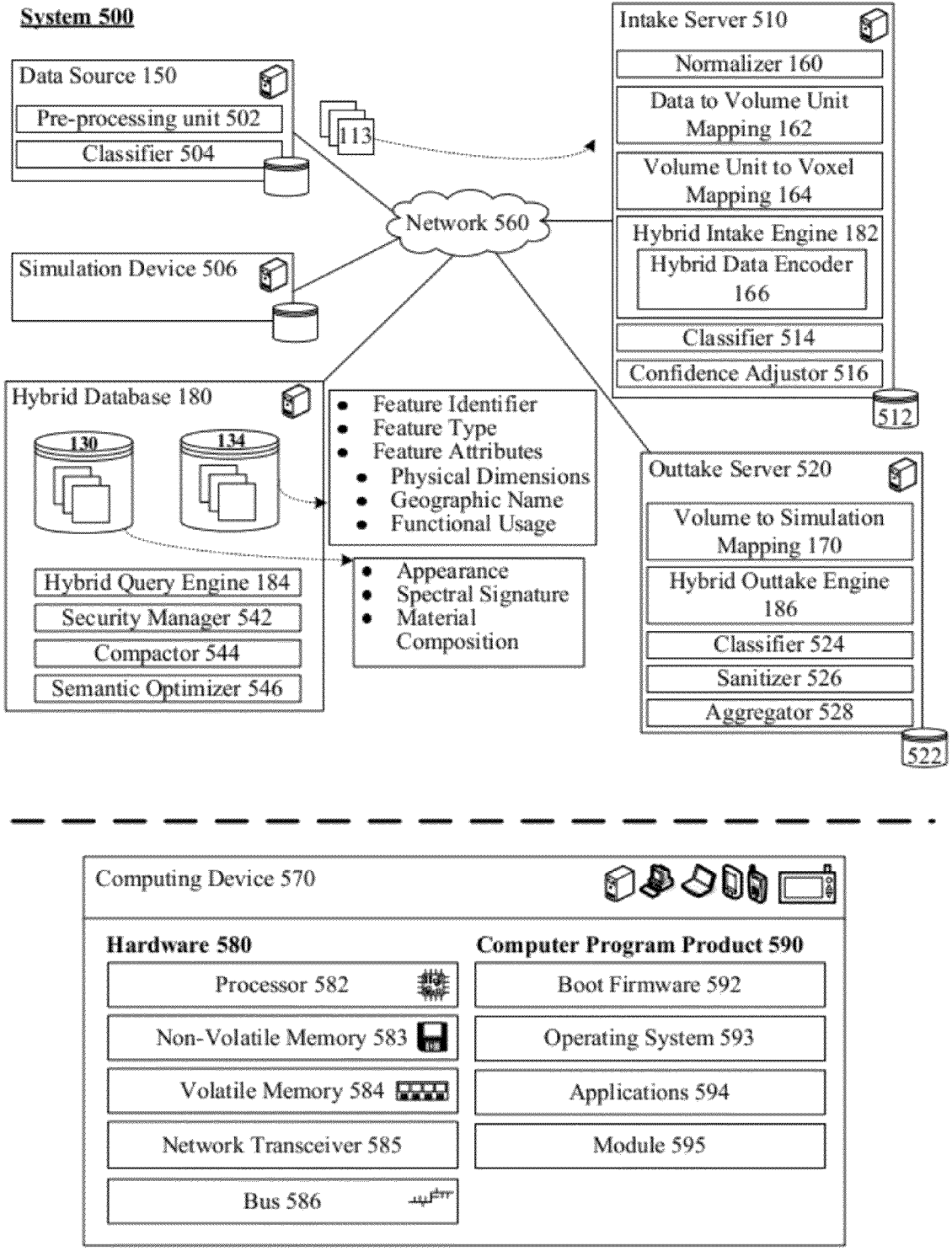
FIG. 5 is a schematic diagram of a system including a hybrid database in accordance with an embodiment of disclosure.

FIG. 5 is a schematic diagram of a system 500 including a hybrid database 180 in accordance with an embodiment of the inventive arrangements disclosed herein. In system 500, a set of data sources 150, a set of simulation devices 506, an intake server 510, an outtake server 520, a hybrid database 180, and other such components can be communicatively linked via a network 560. In lieu of connectivity via network 560, components of system 500 can exchange information via portable media data exchanges, paper document correspondences, human-to-human communications, and the like. The shown components (as items 150, 510, 520, 506, 180) represent one embodiment of the disclosure and are not to be construed as being a limitation of the disclosure's scope.

Various components of system 500, such as items 150, 510, 520, 506, 180, can include one or more computing devices 570, which can include hardware 580 and computer program products 590. The computing devices 570 can be general purpose computing devices, such as personal computers, servers, or in-vehicle computers. The devices 570 can also be special purposed devices specifically manufactured/constructed for a tailored purpose. A special purposed device can have unique hardware, electronic boards, firmware, etc, which is not able to be easily modified by software and used for a different purpose. In various embodiments, devices 570 can be implanted as stand-alone devices, as virtual devices, as distributed devices, as cooperative devices, and the like.

Hardware 580 can include a processor 582, nonvolatile memory 583, volatile memory 584, network transceiver 585, and other components linked via a bus 586. The computer program products 590 can include programmatic instructions that are digitally encoded in a memory (e.g., memory 583, 584) and able to be executed by the processor 582. Computer program products 590 include boot firmware 592, (e.g., basic input/output system (BIOS)), an optional operating system 593 (i.e., special purposed devices can be optimized so an operating system 593 is merged with applications 594 and/or modules 595), applications 594, and other executable modules 595. The operating system 593 can include mobile device operating systems, desktop operating systems, server operating system, virtual operating systems, and/or distributed operating systems.

Unlike many computing systems, system 500 can be a security sensitive one where data classifications are highly important. That is, information acquired from data sources 150, stored in hybrid database 180, and used to drive simulation devices 506 can include unclassified, secret, top secret (including compartmentalization) information. Classification components 504, 514, 524 can exist, which implement comprehensive and conservative rules to automatically classify information into appropriate classifications. Additionally, sanitizers (e.g., sanitizer 526) can be used in system 500 to downgrade semantic content (e.g., from secret to unclassified, for example) of conveyed data elements to ensure that classification based restrictions are not violated. Moreover, different network 560 channels and information handling standards can be imposed based on classification level of the information being conveyed. A further complication is that aggregating and/or analyzing data from different sources 150 can change a classification level of the base data. Automated mechanisms (i.e., classifier 514, aggregator 528, and/or hybrid database 180, when aggregating data from multiple sources 150, can reevaluate and appropriately adjust resultant security classification levels) to conservatively handle data classifications are needed in system 500, especially in embodiments where data acquisition to model production (e.g., duration 212 of embodiment 210, for instance) is expedited.

The security sensitivity requirements can result in physically separate channels (e.g., within network 560, for example) for information conveyance. Further, storage regions for the different data classifications (e.g., within hybrid database 180, for example) can remain isolated from each other. Known standards for handling classified information exist as do a myriad of automated techniques, which can be utilized for system 500. Various components (classifier 504, 514, 524, security manager 542, sanitizer 526) are shown in system 500 to express that system 500 can implement security classification technologies. Comprehensive coverage of these known technologies is not the focus of this disclosure. For simplicity of expression, classification techniques have not been overly elaborated upon herein. It should be understood that integration of classification specific techniques for information handling are contemplated for the disclosure.

It should also be acknowledged that the specific arrangements of system 500 are expected to vary from implementation-to-implementation. For example, discrete network 560 attached servers are shown for intake (intake server 510) and outtake (outtake server 520) of information to and from the hybrid database 180. As shown, intake server 510 can perform intake processing operations (process 410, for example). Outtake server 520 can perform out taking processing operations (process 450 and/or 470, for example). In one embodiment, operations attributed to server 510 or 520 can be integrated into the hybrid database 180 or other system 500 components (e.g., one or more intake server 510 operations can be performed by data source 150; one or more outtake server 520 operations can be performed by simulation device 506). For example, in one embodiment, pre-processing unit 502 can optionally perform operations described for normalizer 160 and/or data to volume unit mapping component 162.

Additional components not explicitly expressed in association with system 500, which are consistent with performing operations described in the disclosure, are to be considered present in system 500. Further, logical mappings from system 500 components to operations described herein are assumed to be present. For example, in various contemplated embodiments, compactor 544 can perform operations described in step 440 of FIG. 4A; semantic optimizer 546 can perform operations described in step 438 of FIG. 4A; and, confidence adjustor 516 can perform operations previously described in step 430 and 438.

Turning to hybrid database 180, a number of characteristics should be noted. First, as new information for hybrid database 180 is acquired (from data sources 150); a probability distribution of surface location and surface appearance can be dynamically and programmatically constructed (using Bayesian statistical learning algorithms, for example). In this sense, voxels of the voxel records 130 do not store a fixed appearance (of volume units 112 from a real-world volumetric space 110) but instead store a dynamic probability of multiple appearances, which can be learned and/or refined over time.

This characteristic of hybrid database 180 not only permits efficient handling of uncertainty, but turns traditional data overload challenges into an advantage. That is, over time, information acquisition via satellites, SIGINT, and other automated sources has geometrically increased. Concurrently, a quantity of human analysts responsible for rapidly responding to acquired information has decreased and/or remained constant. In the past, different information channels or products from different sources 150 were handled in a stove-piped manner. Different human analysts would receive and/or analyze satellite data, SIGINT data, HUMINT, and the like. One result of this situation is that collected data is often not analyzed in a timely manner. Additionally, collected data is typically analyzed in isolation (e.g., single images from satellites are analyzed by people lacking pertinent geospatial related data from other sources 150). Fusion tools are currently deficient and/or lacking, which is a situation expected to worsen in absence of a paradigm shift in how information is managed and analyzed. The hybrid database 180 is a central component for this needed paradigm shift.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-5 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

receiving, at a computing device, a query, wherein said query comprises a constraint defining a bound geographic space, wherein said query comprises a constraint on an attribute of an object;

responsive to receiving the query, determining, at the computing device, a set of unique volumetric storage units (VSUs), which are also referred to as voxels, corresponding to the bound geographic space, wherein each of the VSUs represents a volumetric unit of volumetric storage space;

determining, at the computing device, a subset of VSU records of a database, wherein each of the VSU records in the subset has a unique VSU identifier for one of the determined VSUs;

utilizing, at the computing device, information from the VSU records to determine a set of objects contained in the bound geographic space;

determining, at the computing device, a set of feature records for the set of objects, wherein each of the feature records is indexed against a unique object, wherein each of the determined feature records has an storage value for the attribute that satisfies the constraint on the attribute; and creating, at the computing device, a query response for the received query, said query response comprising information from the determined set of feature records;

wherein the VSU records are stored in a VSU database, wherein the feature records are stored in a feature database, wherein the VSU database and the feature database together are a hybrid database, wherein said query is a hybrid query.

2. The method of claim 1, wherein the determined set of feature records lacks information within the feature records associating objects of the feature records with geospatial coordinates.

3. The method of claim 1, further comprising:

a plurality of sensors capturing raw data of a real-world volumetric space;

segmenting the real-world geographic space into a plurality of regular volumetric units, each of the regular volumetric units corresponding to a VSU having a unique VSU identifier in the database;

separating the captured raw data into object specific data and object independent data;

indexing the object independent data against corresponding VSUs and storing the object independent data in VSU records of the database; and indexing the object-specific-data against corresponding objects having a unique feature identifier and storing the object specific data in feature records.

4. The method of claim 3, wherein the query response comprises object independent data and object specific data, wherein the object independent data is referred to as VSU-level semantic content, wherein the object specific data is referred to as feature-level semantic content, wherein the VSU-level semantic content comprises appearance attributes, spectral signature attributes, and material composition attributes, wherein the feature-level semantic content comprises a feature identifier, a feature type, and feature attributes comprising physical dimensions of a feature, a geographic name, and at least one functional usage attribute.

5. The method of claim 1, wherein the VSU records store VSU referenced geospatial information in an internally inconsistent manner, which results in a probabilistic storage format.

6. The method of claim 1, further comprising:

extracting, at the computing device, feature-level attribute values from the feature records;

determining, at the computing device, at least one volumetric envelope forming an outer boundary of at least one feature of the feature records, said volumetric envelope being within the bound geographic space;

extracting, at the computing device, voxel-level semantic values from the VSU records; and combining, at the computing device, extracted voxel-level semantic values and extracted feature-level attribute values to create the query response.

* * * * *